Figure 1:
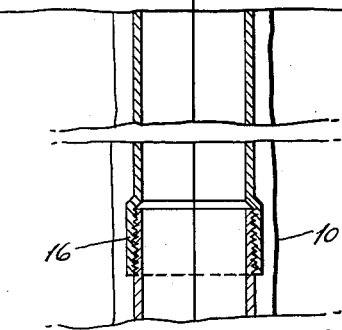

Jan. 1, 1952     G. HERZOG     2,580,544

LOCATING CASING COLLARS IN A WELL

Filed Dec. 30, 1948

NEUTRON INTENSITY INCREASES ⟶

INVENTOR.

GERHARD HERZOG

BY

ATTORNEYS

Patented Jan. 1, 1952

2,580,544

UNITED STATES PATENT OFFICE 2,580,544

LOCATING CASING COLLARS IN A WELL

Gerhard Herzog, Houston, Tex., assignor to The Texas Company, New York, N. Y., a corporation of Delaware Application December 30, 1948, Serial No. 68,343

3 Claims. (Cl. 250—83.6)

This invention relates to the locating of casing collars in a bore hole or well and more particularly to a method in which the casing and casing collars and surrounding formations are bombarded with neutrons and a log or record made of the scattered neutron intensity. The principal object of the invention is the provision of a method of this type in which the positions or depths in the hole of the casing collars or couplings can be accurately measured either as a separate record or in connection with a scattered neutron log of the hole.

There are many times when its is desirable to know the exact depth of the interface or boundary between two formations traversed by the well and which boundary may have been subsequently covered by the well casing. It is often the desire to perforate the casing opposite a thin producing formation and it has been found frequently that when the logging cable measuring reel is relied upon to show the depth of the formation boundaries, such factors as stretch in the cable, wearing of parts of the measuring reel, etc. cause an incorrect indication of depth. As a result the perforating may be done as much as several feet, usually below, the desired depth.

Suggestions have been made for placing radioactive markers either in the casing or the surrounding formations at known depths so that by means of a radiation detector these points can be located subsequently. These markers frequently contaminate the well by radioactivity so that a subsequent log of the natural radioactivity of the formations traversed by the hole cannot be accurately made. With the method of the present invention, no radioactive material is placed permanently in the well and no contamination results. However, a permanent record of the exact position of the casing collars in the bore hole can be made and knowing the lengths of the sections making up the casing, the depth of any formation or interface can be recorded so that, for example, the casing can be subsequently perforated at the proper depth.

In accordance with the invention a source of neutrons and a detector of slow neutrons mounted close to each other in a suitable housing are lowered through the well. The neutrons from the source bombard the casing and casing collars as well as the formations traversed by the hole. The output of the neutron detector is led to the surface where one or more records are made of its response, usually on a strip or strips of moving tape or paper. The record will show variations in the structure of the surrounding formations, for example, a higher intensity of the scattered neutrons will be indicated opposite a fluid-containing formation than opposite a dry formation. The records will also contain at more or less equally spaced intervals pronounced depressions in the logging curve indicating the positions of the casing collars or couplings.

In order that the depressions in the curve comprising the record or log due to the collars will be sharp and easily distinguishable from the other peaks or depressions due to changes in the formations it is preferred that the speed at which the source and detector are passed through the hole and the time constant of the integration circuit be properly proportioned. Thus the speed should be adjusted so that the measuring instrument will travel a distance equal to the length of a casing collar or coupling in a time of the order of the time constant of the integration circuit.

Figure 2:
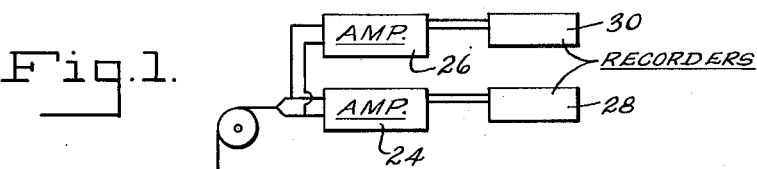
Figure 2:
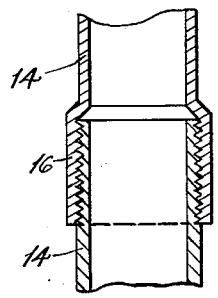
Figure 3:
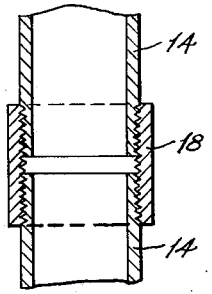
Figure 4:
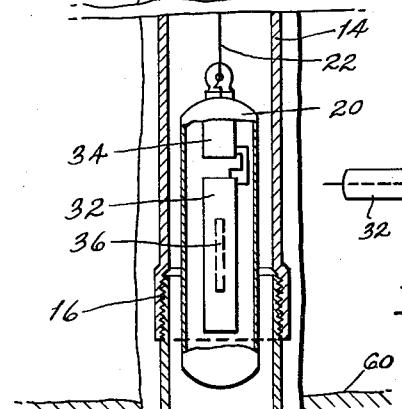
Figure 4:
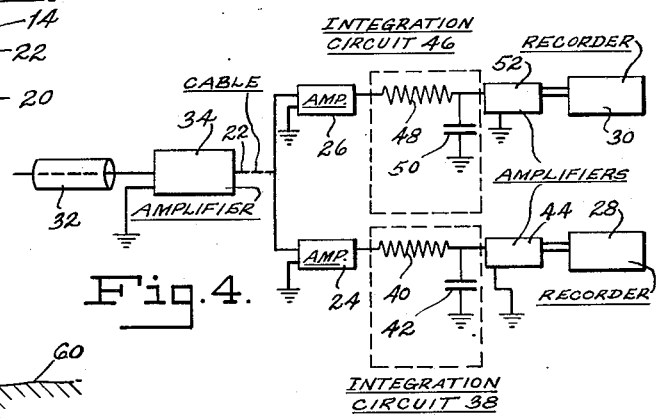
Figure 5:
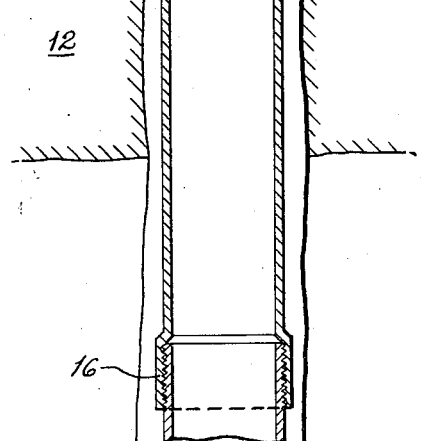
Figure 5:
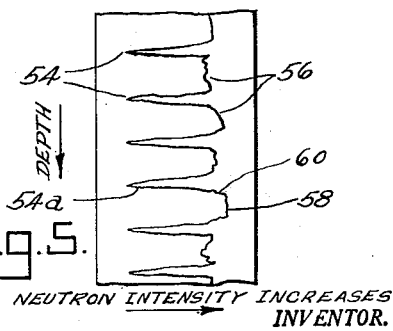

For a better understanding of the invention reference may be had to the accompanying drawing in which:

Figure 1 is a vertical sectional elevation showing a neutron bombarding and measuring instrument suspended within a cased bore hole, Figure 2 is a section through a casing joint showing one form of coupling, Figure 3 is a section similar to Figure 2 but showing a joint in which a separate casing collar is used, Figure 4 is a diagrammatic illustration of certain parts of an apparatus useful in carrying out the method, and, Figure 5 represents a small section of a log or record strip typical of those which can be made in utilizing this method.

Referring to the drawing, a bore hole 10 is shown as penetrating the formation 12 which for purposes of illustration may be considered as a sand containing salt water. The hole 10 is provided with a casing 14 made up as is usual of sections usually uniform in length and coupled together at their adjacent ends either by means of upset couplings indicated at 16 in Figures 1 and 2 or by means of separate collars 18 as shown in Figure 3. An instrument housing 20 is shown as suspended within the casing by means of a cable 22 passing upwardly to the surface and then to a pair of amplifiers 24 and 26 connected to recorders 28 and 30. The instrument housing 20 is shown as broken away to disclose a slow neutron detector 32 the output of which is led to a suitable preamplifier 34 connected in turn to the lower end of the cable 22 so that the output of the detector will pass through the preamplifier and the cable to the amplifiers 24 and 26 at the surface. Also disposed within the instrument housing 20 and preferably within and coaxial with the detector 32 is a source of neutrons 36 which may comprise a mixture of radium and beryllium. The detector 32 is preferably a proportional counter and the arrangement of the neutron source within a detector of this type is disclosed in the United States Letters Patent issued to K. C. Crumrine and myself June 22, 1948, No. 2,443,731, on an application filed November 27, 1943. With this arrangement of source and detector the path of the fast neutrons from the source outwardly into the casing and surrounding formations is substantially horizontal.

As the measuring instrument 20 is passed through the cased well the neutrons from the source 36 pass outwardly and since these are fast neutrons they are not registered. These neutrons in passing into the wall of the casing 14, the couplings 16 or collars 18 and the formations such as that indicated at 12 surrounding the well are slowed down in these materials and some are scattered back, also in a substantially horizontal plane, to the detector 32. As stated hereinabove the output of the detector is preamplified at 34 and conducted upwardly to the surface over the cable 22 where it is passed to the amplifiers 24 and 26. In Figure 4 is shown somewhat schematically some of the apparatus at the surface. The output of the amplifier 24 is led through an integration circuit 38 comprising a resistance 40 and a capacitance 42 and then to an additional amplifier 44 connected to the recorder 28. Likewise, the output of the amplifier 26 is passed through the integration circuit 46 comprising a resistance 48 and a capacitance 50 and then through amplifier 52 to the recorder 30.

The length of travel of the logging instrument over which a reading averages is equal to its velocity multiplied by a time. This time is represented by the time constant of the resistance-capacitance integration circuit and the velocity is of course the speed at which the instrument 20 is lowered or raised through the well. As has been stated hereinbefore in order to obtain clear indications of the positions of the casing collars, the speed at which the measuring instrument is passed through the hole and the time constant of the integration circuit should be properly proportioned, or in other words, either the speed should be adjusted so that the instrument will travel a distance equal to the length of a casing collar or coupling in a time of the order of the time constant of the integration circuit or the integration circuit should be designed to have a time constant commensurate with the time which it will take the neutron source and detector to pass a casing collar or coupling at a predetermined speed.

As is well known, the values of the resistance and capacitance comprising an integration circuit determine the time constant of that circuit. Let us assume that in Figure 4 the lower part of the circuit is designed to record at 28 the detector response produced by the neutrons slowed and scattered in the earth formations surrounding the hole and returned to the detector. The values of the resistance 40 and the capacitance 42 will, therefore, be selected such that the record will clearly indicate the intensities of these scattered neutrons and thus their nature and the boundaries between adjacent formations. Again, assuming that the upper part of the circuit in Figure 4 is designed to record primarily the casing collar reflections, the value of the resistance 48 and capacitance 50 will be selected, knowing the speed at which the instrument will travel through the hole and the vertical lengths of the casing collars or couplings, to provide a time constant equal to the time it will take the source and detector to pass one of the collars or couplings. The two records made by the recorders 28 and 30 will be made simultaneously, preferably on tapes or chart paper which moves at the same speed in both recorders. After the records have been made, one may be superimposed upon the other or laid parallel and adjacent thereto and the casing collar record can be used as an exact measure of the depth of the formation features which appear on the other record. This is true, of course, since the lengths of the individual casing sections 14 will be known and by multiplying this length by the number of the casing collar depressions appearing on the record and interpolating if necessary between two of these depressions the depth to a particular interface or boundary can be accurately ascertained.

If desired, instead of utilizing the two recorders 28 and 30 and the two integration circuits 38 and 46 as has been described, one integration circuit and its amplifiers and one recorder can be used to make one record which will indicate not only the features of the formations but also the position of the casing collars or couplings. In this case the time constant of the integration circuit will have to be designed so that these formation features as well as the casing collar depressions will show up on the record and it is understood that with a single record of this type one may have to sacrifice to a slight extent some detail in the formation part of the record and for the same reason the casing collar depressions may not be quite as pronounced as where two records are made and the time constants of their circuits selected to produce the two records to the best advantage.

In Figure 5 a section of a single record is shown, the casing collar or coupling depressions being indicated at 54 and the features of the surrounding formations at 56. As an example and assuming that the formation 12 is, say, a sand containing salt water this sand may appear in the record by the high intensity indication 58. Assuming that it is desired to know the exact depth of the upper boundary 60 of the formation 12, this boundary being also indicated on the log at 60, it is merely necessary to count the number of casing collar depressions down to and including that indicated at 54a and to multiply by the length of the individual casing sections 14. By way of example, assuming that the casing sections 14 are 60 feet long and that the one indicated at 54a is the 100th such depression from the start of the log this will amount to 100 times 60 or 6000 feet and by interpolation the boundary 60 may be considered as, say, 15 feet below the depression 54a. The total depth to the boundary 60 will therefore be 6015 feet.

Obviously many modifications and variations of the invention, as hereinbefore set forth, may be made without departing from the spirit and scope thereof, and therefore only such limitations should be imposed as are indicated in the appended claims.

I claim:

1. In a bore hole provided with a casing the sections of which are connected by enlarged threaded couplings, the method of locating the position of said couplings which comprises passing a source of neutrons through the cased bore hole whereby the casing, casing couplings and surrounding formations are subjected to neutron bombardment, producing electrical pulses by the neutrons scattered within the surrounding material and returned to the bore hole near the source, integrating said pulses in a resistance-capacitance circuit having a time constant commensurate with the time required for the source to pass one of said couplings, amplifying and recording the integrated pulses and from the record determining the points of least scattered neutron intensity, said points indicating the position of the casing couplings in the hole.

2. In a bore hole provided with a casing, the ends of adjacent sections of which are connected by exterior casing collars, the method of locating the depth of said collars in the hole which comprises passing a source of neutrons through the cased bore hole so as to subject the surrounding material to neutron bombardment, producing electrical pulses by the neutrons scattered within said surrounding material and returned to the bore hole in the vicinity of said source, integrating said pulses in a resistance-capacitance circuit having a time constant, controlling the speed at which the source is passed through the hole so that the source will travel a distance equal to the length of a casing collar in a time commensurate with the time constant of said resistance-capacitance circuit, amplifying and recording the integrated pulses, and from the record determining the points of least scattered neutron intensity, said points indicating the position of the casing collars in the hole.

3. In a bore hole provided with a casing, the ends of adjacent sections of which are connected by exterior casing collars, the method of locating the depth of said collars in the hole which comprises passing a source of neutrons through the cased bore hole so as to subject the surrounding material to neutron bombardment, producing electrical pulses by the neutrons scattered within said surrounding material and return to the bore hole in the vicinity of said source, integrating said pulses in a resistance-capacitance circuit having a time constant, adjusting said time constant so that for the speed at which the source is passed through the hole the time constant will be equal to the time required for the source to travel a distance equal to the length of a casing collar, amplifying and recording the integrated pulses, and from the record determining the points of least scattered neutron intensity, said points indicating the position of the casing collars in the hole.

GERHARD HERZOG.

REFERENCES CITED

The following references are of record in the file of this patent:

UNITED STATES PATENTS

| Number | Name | Date |
|---|---|---|
| 2,335,409 | Hare | Nov. 30, 1943 |
| 2,390,433 | Fearon | Dec. 4, 1945 |
| 2,443,731 | Herzog et al. | June 22, 1948 |

OTHER REFERENCES

Radioactivity Well Logs, V. J. Mercier, reprint from The Oil Weekly, October 14, 1946, and October 21, 1946.

Bulletin RA-47-B, Lane Wells Company, 1948, Los Angeles, Calif., pp. 17 and 31.